(12) United States Patent
Ke et al.

(10) Patent No.: US 9,729,385 B2
(45) Date of Patent: Aug. 8, 2017

(54) SERVICE PROVISIONING METHOD, DEVICE, AND SYSTEM IN COAXIAL CABLE SYSTEM

(71) Applicant: Huawei Technologies Co., Ltd., Shenzhen (CN)

(72) Inventors: Bo Ke, Shenzhen (CN); Chenghu Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 440 days.

(21) Appl. No.: 14/312,839

(22) Filed: Jun. 24, 2014

(65) Prior Publication Data
US 2015/0032862 A1    Jan. 29, 2015

Related U.S. Application Data

(63) Continuation of application No. PCT/CN2013/079905, filed on Jul. 23, 2013.

(51) Int. Cl.
*G06F 15/177* (2006.01)
*H04L 12/24* (2006.01)
(Continued)

(52) U.S. Cl.
CPC ...... *H04L 41/0226* (2013.01); *H04L 12/2898* (2013.01); *H04L 41/0806* (2013.01);
(Continued)

(58) Field of Classification Search
CPC . H04L 12/24; H04L 41/0226; H04L 12/2898; H04L 41/0806; H04L 61/2015;
(Continued)

(56) References Cited

U.S. PATENT DOCUMENTS 6,070,246 A    5/2000   Beser
8,155,024 B2   4/2012   Hsu et al.
(Continued)

FOREIGN PATENT DOCUMENTS

CN    102025574    4/2011
CN    102624560    8/2012
(Continued)

OTHER PUBLICATIONS

Cisco Systems, "Configuring DHCP, ToD, TFTP Services on Cisco's CMTS" All-In-One Configuration, http://www.cisco.com/c/en/us/support/docs/broadband-cable/cable-modem-termination-systems-cmts/28990-all-in-one-config.html, Updated Nov. 8, 2006, 14 pages.

*Primary Examiner* — Benjamin M Thieu
(74) *Attorney, Agent, or Firm* — Slater Matsil, LLP

(57) ABSTRACT

Embodiments of the present disclosure provide a service provisioning method in a coaxial cable system, the method comprises: a CMC receives a DHCP Ack message from a DHCP server and replaces an address of a TFTP server in the DHCP Ack message with an IP address of the CMC; the CMC sends the DHCP Ack message carrying the IP address of the CMC to the CM; and the CMC receives a request message from the CM for delivering a configuration file, acquires a configuration file corresponding to the CM, and after converting the configuration file corresponding to the CM into a format identifiable by the CM, sends the configuration file to the CM.

13 Claims, 3 Drawing Sheets

(51) Int. Cl.
  *H04L 29/12* (2006.01)
  *H04L 12/28* (2006.01)
(52) U.S. Cl.
  CPC ............... *H04L 61/2015* (2013.01); *H04Q 2213/13109* (2013.01); *H04Q 2213/13332* (2013.01)
(58) Field of Classification Search
  CPC ...... H04L 41/0803; H04Q 2213/13109; H04Q 2213/13332
  See application file for complete search history.

(56) References Cited

U.S. PATENT DOCUMENTS

| | | | |
|---|---|---|---|
| 2002/0093970 A1 | 7/2002 | Amit | |
| 2003/0140345 A1* | 7/2003 | Fisk | H04L 29/06027 725/78 |
| 2009/0296566 A1* | 12/2009 | Yasrebl | H04L 41/5087 370/221 |
| 2011/0058491 A1* | 3/2011 | Hsu | H04L 12/2801 370/252 |
| 2012/0257893 A1* | 10/2012 | Boyd | H04L 12/2801 398/58 |

FOREIGN PATENT DOCUMENTS

| | | |
|---|---|---|
| CN | 102739421 | 10/2012 |
| EP | 2509259 A1 | 10/2012 |

\* cited by examiner

SERVICE PROVISIONING METHOD, DEVICE, AND SYSTEM IN COAXIAL CABLE SYSTEM

CROSS-REFERENCE TO RELATED APPLICATIONS

This application is a continuation of International Application No. PCT/CN2013/079905, filed on Jul. 23, 2013, which is hereby incorporated by reference in its entirety.

TECHNICAL FIELD

The present disclosure relates to the communications field, and in particular, to a service provisioning method, a device, and a system in a coaxial cable system.

BACKGROUND

In addition to that a twisted pair (x Digital Subscriber Line, xDSL) and an optical fiber (fiber to the x, FTTx) can provide a broadband access service, a coaxial cable (Cable) can provide the broadband access service. Providing the broadband access service by using the coaxial cable has mature development in North America and European regions, and a competitive situation has taken shape between a broadcast and television operator and a telecommunications operator. Conditions in China are relatively special, where the broadband access service is generally provided by using the twisted-pair cable (xDSL), and it is rare that a broadband service is accessed by using a broadcast and television coaxial cable. There are various technical standards for supporting a bidirectional broadband service in the coaxial cable, where the most well-known and maturest technical standard is the Date Over Cable Service Interface Specification (Data Over Cable Service Interface Specification, DOCSIS) formulated by North America. According to definitions in the DOCSIS 3.0, bandwidth modulated by the cable coaxial may exceed bandwidth provided by the twisted-pair cable and may even compare favorably with bandwidth of fiber to the x. China is formulating a Chinese DOCSIS standard (Chinese DOCSIS, C-DOCSIS), which accords with China's actual conditions and is used to guide a bidirectional service of a cable television.

Comparisons between network service provisioning of a broadcast and television operator and that of a telecommunications operator are as follows:

1. According to the DOCSIS standard, for a network service of the broadcast and television operator, a TFTP server needs to be installed and deployed to implement CM service provisioning while this is not required for a network service of the telecommunications operator.

2. A service flow connection between a CM and a CMC of the network service of the broadcast and television operator is dynamically established and disconnected, and a service flow connection between the CMC and an optical line terminal (Optical line terminal, OLT) is preconfigured and is not dynamically established or removed after being configured. However, on a telecommunications network, a service flow connection between a customer premises equipment (remote terminal unit, RTU) and the OLT is preconfigured and is not dynamically established or removed after being configured.

In general, an operator has only the network service of the broadcast and television operator or the network service of the telecommunications operator. However, with convergence of telecommunications services and broadcast and television services, some operators, such as a multiple service operator (Multiple Service Operator, MSO), have both a telecommunications network and a broadcast and television network. According to the technical definitions in the standard, these two networks differ greatly in service provisioning processes. That is, the MSO operator needs to deploy both service provisioning systems, which results in high costs and low efficiency.

SUMMARY

Embodiments of the present disclosure provide a service provisioning method in a coaxial cable system, so as to solve a problem about how to make a network service process of a broadcast and television operator compatible with that of a telecommunications operator.

According to a first aspect, a service provisioning method in a coaxial cable system is provided, where the Cable system includes a Dynamic Host Configuration Protocol DHCP server, a coaxial media converter CMC, and a cable modem CM; the CMC connects to the DHCP server on a network side and connects to the CM on a user side; and the method includes:

receiving, by the CMC, a DHCP Ack message from the DHCP server and replacing an address of a Trivial File Transfer Protocol TFTP server in the DHCP Ack message with an Internet Protocol IP address of the CMC;

sending, by the CMC, the DHCP Ack message carrying the IP address of the CMC to the CM; and receiving, by the CMC from the CM, a request message for delivering a configuration file, acquiring a configuration file corresponding to the CM, and after converting the configuration file corresponding to the CM into a format identifiable by the CM, sending the configuration file to the CM.

With reference to the first aspect, in a first possible implementation manner of the first aspect, before the receiving, by the CMC, a DHCP Ack message from the DHCP server, the method further includes:

receiving, by the CMC, a DHCP Discovery packet from the CM and broadcasting the DHCP Discovery packet to the network side;

sending, by the CMC, a DHCP Offer packet from the DHCP server to the CM, where the DHCP Offer packet carries an IP address allocated by the DHCP server to the CM; and receiving, by the CMC, a DHCP Request message from the CM and sending the DHCP Request message to the DHCP server.

With reference to the first aspect, in a second possible implementation manner of the first aspect, before the acquiring a configuration file corresponding to the CM, the method further includes:

saving, by the CMC, a correspondence between a Media Access Control MAC address of the CM and a configuration file name; and the acquiring a configuration file corresponding to the CM specifically includes:

extracting the MAC address of the CM from the request message, of the CM, for delivering a configuration file, acquiring a corresponding configuration file name from the correspondence between the MAC address of the CM and the configuration file name by using the MAC address, and finding a corresponding configuration file according to the acquired configuration file name.

With reference to the first aspect, the first possible implementation manner of the first aspect, or the second possible implementation manner of the first aspect, in a third possible implementation manner of the first aspect, the format identifiable by the CM complies with the Data Over Cable Service Interface Specification.

According to a second aspect, a coaxial media converter CMC is provided, where the CMC connects to a Dynamic Host Configuration Protocol DHCP server on a network side and connects to a cable modem CM on a user side, and the CMC includes:

a first receiver, configured to receive a DHCP Ack message from the DHCP server, where the DHCP Ack message carries an address of a Trivial File Transfer Protocol TFTP server;

a first processor, configured to replace the address of the TFTP server in the DHCP Ack message with an IP address of the CMC;

a first sender, configured to send the DHCP Ack message carrying the IP address of the CMC to the CM;

a second receiver, configured to receive, from the CM, a request message for delivering a configuration file; and a second processor, configured to acquire a configuration file corresponding to the CM and after converting the configuration file corresponding to the CM into a format identifiable by the CM, send the configuration file to the CM by using a second sender.

With reference to the second aspect, in a first possible implementation manner of the second aspect, the CMC further includes:

the second sender, configured to receive a DHCP Discovery packet from the CM and broadcast the DHCP Discovery packet to the network side, where:

the first sender is further configured to send a DHCP Offer packet from the DHCP server to the CM, where the DHCP Offer packet carries an IP address allocated by the DHCP server to the CM; and the second receiver is further configured to receive a DHCP Request message from the CM and send the DHCP Request message to the DHCP server.

With reference to the second aspect, in a second possible implementation manner of the second aspect, the CMC further includes:

a memory, configured to save a correspondence between a Media Access Control MAC address of the CM and a configuration file name; and the second processor is specifically configured to:

extract the MAC address of the CM from the request message, of the CM, for delivering a configuration file, acquire a corresponding configuration file name from the correspondence between the MAC address of the CM and the configuration file name by using the MAC address, and find a corresponding configuration file according to the acquired configuration file name.

According to a third aspect, a coaxial media converter CMC is provided, where the CMC connects to a Dynamic Host Configuration Protocol DHCP server on a network side and connects to a cable modem CM on a user side, and the CMC includes:

a network-side interface, configured to receive a DHCP Ack message from the DHCP server, where the DHCP Ack message carries an address of a Trivial File Transfer Protocol TFTP server;

an address processing unit, configured to replace the address of the TFTP server in the DHCP Ack message with an IP address of the CMC;

a user-side interface, configured to send the DHCP Ack message carrying the IP address of the CMC to the CM and receive, from the CM, a request message for delivering a configuration file; and a configuration file processing unit, configured to acquire a configuration file corresponding to the CM and after converting the configuration file corresponding to the CM into a format identifiable to the CM, send the configuration file to the CM by using the user-side interface.

With reference to the third aspect, in a first possible implementation manner of the third aspect, the CMC further includes:

a sending unit, configured to receive a DHCP Discovery packet from the CM and broadcast the DHCP Discovery packet to the network side, where:

the sending unit is further configured to send a DHCP Offer packet from the DHCP server to the CM, where the DHCP Offer packet carries an IP address allocated by the DHCP server to the CM; and a receiving unit, configured to receive a DHCP Request message from the CM and send the DHCP Request message to the DHCP server.

With reference to the third aspect, in a second possible implementation manner of the third aspect, the CMC further includes:

a saving unit, configured to save a correspondence between a Media Access Control MAC address of the CM and a configuration file name; and the configuration file processing unit is configured to:

extract the MAC address of the CM from the request message, of the CM, for delivering a configuration file, acquire a corresponding configuration file name from the correspondence between the MAC address of the CM and the configuration file name by using the MAC address, and find a corresponding configuration file according to the acquired configuration file name.

According to a fourth aspect, a coaxial cable system is provided, where the Cable system includes a Dynamic Host Configuration Protocol DHCP server, a coaxial media converter CMC, and a cable modem CM; and the CMC connects to the DHCP server on a network side and connects to the CM on a user side, where:

the CMC is configured to receive a DHCP Ack message from the DHCP server and replace an address of a Trivial File Transfer Protocol server with an IP address of the CMC; send the DHCP Ack message carrying the IP address of the CMC to the CM; and receive, from the CM, a request message for delivering a configuration file, acquire a configuration file corresponding to the CM, and after converting the configuration file corresponding to the CM into a format identifiable by the CM, send the configuration file to the CM.

With reference to the fourth aspect, in a first possible implementation manner of the fourth aspect, the CMC is further configured to:

receive a DHCP Discovery packet from the CM and broadcast the DHCP Discovery packet to the network side;

send a DHCP Offer packet from the DHCP server to the CM, where the DHCP Offer packet carries an IP address allocated by the DHCP server to the CM; and receive a DHCP Request message from the CM and send the DHCP Request message to the DHCP server.

With reference to the fourth aspect, in a second possible implementation manner of the fourth aspect, the CMC is further configured to:

save a correspondence between a Media Access Control MAC address of the CM and a configuration file name; and the acquiring a configuration file corresponding to the CM specifically includes:

extracting the MAC address of the CM from the request message, of the CM, for delivering a configuration file, acquiring a corresponding configuration file name from the correspondence between the MAC address of the CM and the configuration file name by using the MAC address, and finding a corresponding configuration file according to the acquired configuration file name.

The embodiments of the present disclosure provide a service provisioning method in a coaxial cable system, where in the method, a CMC receives a DHCP Ack message from a DHCP server and replaces an address of a Trivial File Transfer Protocol TFTP server in the DHCP Ack message with an Internet Protocol IP address of the CMC; the CMC sends the DHCP Ack message carrying the IP address of the CMC to a CM; and the CMC receives, from the CM, a request message for delivering a configuration file, acquires a configuration file corresponding to the CM, and after converting the configuration file corresponding to the CM into a format identifiable by the CM, sends the configuration file to the CM, thereby implementing that a broadcast and television network of a C-DOCSIS standard is compatible and supported on the basis of a telecommunications network configuration system.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art on the basis of the embodiments of the present disclosure without creative efforts shall fall within the protection scope of the present disclosure.

Figure 1:
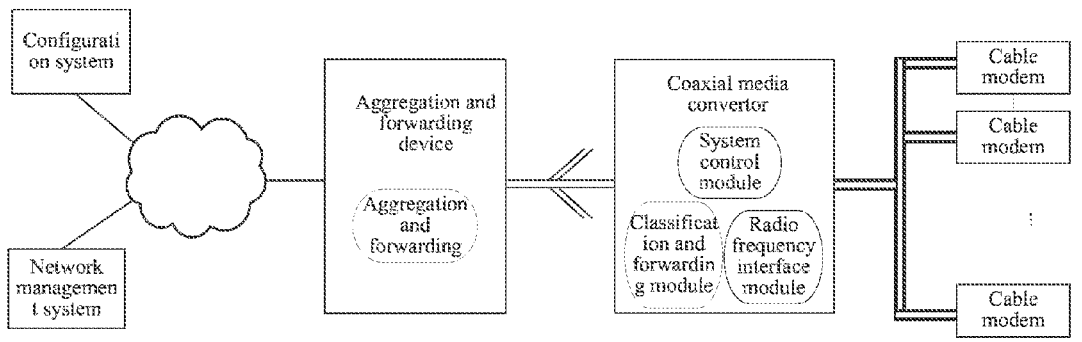
FIG. 1 is an architecture diagram of a C-DOCSIS system according to the prior art.

Refer to FIG. 1. FIG. 1 is an architecture diagram of a C-DOCSIS system according to the prior art. As shown in FIG. 1, a cable modem (Cable Modem, CM) connects to a coaxial distribution network of an operator and a home area network and is responsible for data forwarding between them; and a user equipment (User Equipment, UE) may be built in the CM or may serve as a piece of standalone equipment. Typical UEs include a personal computer, an embedded multimedia terminal adapter (Embedded Multimedia Terminal Adapter, eMTA), a home router, a set top box device, and the like. A coaxial media converter (Coax Medium Converter, CMC) connects to the coaxial distribution network and an aggregation network. The CMC communicates with the CM, which implements a network communication function of a coaxial cable in the C-DOCSIS system; the CMC connects to the aggregation network, which implements data flow forwarding and service mapping; and the CMC accesses a configuration system and a network management system of the operator by using the aggregation network. The configuration system of the C-DOCSIS provides a service and device configuration service of the C-DOCSIS system. The configuration system can implement functions, such as generating and delivering a configuration file and software upgrading of a terminal device. The configuration system includes a Dynamic Host Configuration Protocol (Dynamic Host Configuration Protocol, DHCP) server, a configuration file server, a time protocol server, and the like. The CMC, which is close to a user side, may be located in places, such as the top of a building or an optical node of an existing hybrid fiber coaxial (Hybrid Fiber Coaxial, HFC) network. A system control module, a classification and forwarding module, a radio frequency interface module, and the like may be integrated into the CMC. The system control module may be used to implement configuration and management of the radio frequency interface module and the classification and forwarding module. For example, in a process that the CM registers with the CMC, the system control module may be used to parse a service flow and classification information that are reported by the CM and correspondingly configure the classification and forwarding module. The system control module further has other functions, such as receiving a message of the network management system and the configuration system and implementing service configuration and management. The classification and forwarding module performs data packet matching according to related fields, such as a MAC address, an IP address, and a port number of TCP, UDP, IP, LLC, and the like in a downstream data packet, and maps each data packet to a corresponding service flow, so as to complete classification and forwarding of the data packet; and the classification and forwarding module inserts an upstream data flow into an aggregation network service identifier according to a C-DOCSIS service mapping rule and forwards the data to a network side. The radio frequency interface module mainly implements a physical layer function and a MAC layer function that are regulated in the standard, processes a C-DOCSIS MAC management message, and the like, where the physical layer function includes: in a downstream direction, service flow-based scheduling, queuing, and shaping, C-DOCSIS frame header creating, and radio frequency modulation and transmission; in an upstream direction, radio frequency signal receiving, C-DOCSIS frame header processing, and queuing and scheduling; and processing of a C-DOCSIS MAC management message.

In a C-DOCSIS system, a service provisioning process of a CM may include:

1. The CM acquires an IP address of the CM, an address of a Trivial File Transfer Protocol (Trivial File Transfer Protocol, TFTP) server, and a configuration file name of the CM by using a DHCP server.

2. The CM downloads a configuration file by using the TFTP server and the CM dynamically establishes a service flow between the CM and a CMC according to service flow configuration.

3. The CM registers the configuration file with the CMC.

4. The CM goes online and works properly.

Figure 2:
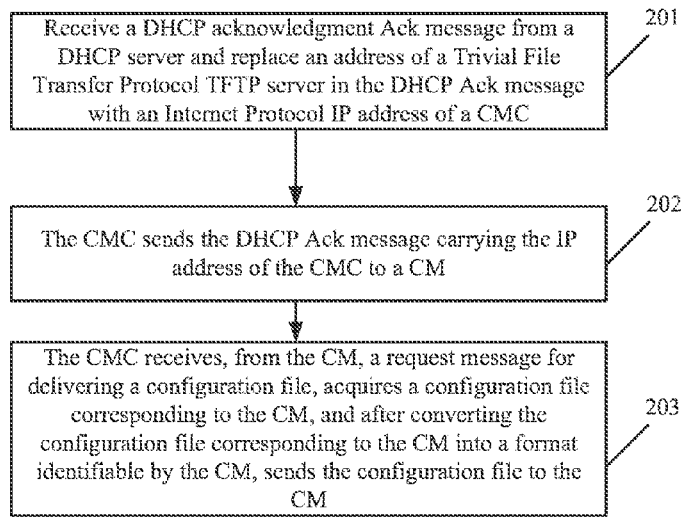
FIG. 2 is a flowchart of a service provisioning method in a coaxial cable system according to an embodiment of the present disclosure.

Refer to FIG. 2. FIG. 2 is a flowchart of a service provisioning method in a coaxial cable system according to an embodiment of the present disclosure. As shown in FIG. 2, the method includes the following steps:

Step 201: Receive a DHCP Ack message from a DHCP server and replace an address of a Trivial File Transfer Protocol TFTP server in the DHCP Ack message with an Internet Protocol IP address of a CMC.

Specifically, the CMC intercepts a DHCP packet sent by a CM and replaces the address of the TFTP server in the DHCP packet with the IP address of the CMC, so as to establish a dynamic connection between the CMC and the CM.

Step 202: The CMC sends the DHCP Ack message carrying the IP address of the CMC to the CM.

Step 203: The CMC receives, from the CM, a request message for delivering a configuration file, acquires a configuration file corresponding to the CM, and after converting the configuration file corresponding to the CM into a format identifiable by the CM, sends the configuration file to the CM.

Optionally, before the acquiring a configuration file corresponding to the CM, the method further includes:

saving, by the CMC, a correspondence between a Media Access Control MAC address of the CM and a configuration file name.

The acquiring a configuration file corresponding to the CM specifically includes:

extracting the MAC address of the CM from the request message, of the CM, for delivering a configuration file, acquiring a corresponding configuration file name from the correspondence between the MAC address of the CM and the configuration file name by using the MAC address, and finding a corresponding configuration file according to the acquired configuration file name.

Specifically, a User goes to a telecommunication business office to apply for service subscription, such as applying for service subscription of a service of 5 M traffic. The service for which the user applies is configured into a CMC and is saved as a first configuration file, where a format of the first configuration file is a telecommunications format, and the telecommunications format, which is self-defined by each device manufacturer and is a suitable format for a telecommunications network, does not have a unified format standard. When acquiring a message, sent by the CM, for requesting a configuration file, the CMC device extracts the MAC address of the CM from the request message, acquires a configuration file name corresponding to the MAC address according to the correspondence between the MAC address of the CM and the configuration file name, and finds the corresponding configuration file according to the acquired configuration file name. A format of the configuration file is a format of the telecommunications network, and the CMC needs to convert the format of the telecommunications network into a format identifiable by a C-DOCSIS network, such as a disk operating system (Disk Operating System, DOS) format.

Optionally, before the receiving, by the CMC, a DHCP Ack message from the DHCP server, the method further includes:

receiving, by the CMC, a DHCP Discovery packet from the CM and broadcasting the DHCP Discovery packet to a network side;

sending, by the CMC, a DHCP Offer packet from the DHCP server to the CM, where the DHCP Offer packet carries an IP address allocated by the DHCP server to the CM; and receiving, by the CMC, a DHCP Request message from the CM and sending the DHCP Request message to the DHCP server.

Optionally, the format identifiable by the CM complies with the Data Over Cable Service Interface Specification.

This embodiment of the present disclosure provides a service provisioning method in a coaxial cable system, where in the method, a CMC receives a DHCP Ack message from a DHCP server and replaces an address of a Trivial File Transfer Protocol TFTP server in the DHCP Ack message with an Internet Protocol IP address of the CMC; the CMC sends the DHCP Ack message carrying the IP address of the CMC to a CM; and the CMC receives, from the CM, a request message for delivering a configuration file, acquires a configuration file corresponding to the CM, and after converting the configuration file corresponding to the CM into a format identifiable by the CM, sends the configuration file to the CM, thereby implementing that a broadcast and television network of a C-DOCSIS standard is compatible and supported on the basis of a telecommunication network configuration system.

Figure 3:
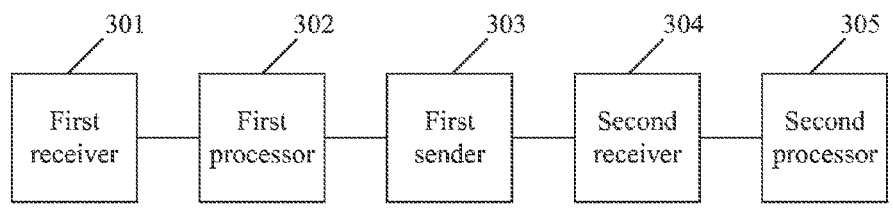
FIG. 3 is a device structural diagram of a CMC according to an embodiment of the present disclosure.

Refer to FIG. 3. FIG. 3 is a device structural diagram of a CMC according to an embodiment of the present disclosure. The CMC connects to a Dynamic Host Configuration Protocol DHCP server on a network side and connects to a cable modem CM on a user side. As shown in FIG. 3, the CMC includes:

a first receiver 301, configured to receive a DHCP Ack message from the DHCP server, where the DHCP Ack message carries an address of a Trivial File Transfer Protocol TFTP server;

a first processor 302, configured to replace the address of the TFTP server in the DHCP Ack message with an IP address of the CMC, where specifically, the CMC intercepts a DHCP packet sent by the CM and replaces the address of the TFTP server in the DHCP packet with the IP address of the CMC, so as to establish a dynamic connection between the CMC and the CM;

a first sender 303, configured to send the DHCP Ack message carrying the IP address of the CMC to the CM;

a second receiver 304, configured to receive, from the CM, a request message for delivering a configuration file; and a second processor 305, configured to acquire a configuration file corresponding to the CM and after converting the configuration file corresponding to the CM into a format identifiable by the CM, send the configuration file to the CM by using a second sender.

The CMC further includes:

a memory, configured to save a correspondence between a Media Access Control MAC address of the CM and a configuration file name.

The second processor 305 is specifically configured to:

extract the MAC address of the CM from the request message, of the CM, for delivering a configuration file; acquire a corresponding configuration file name from the correspondence between the MAC address of the CM and the configuration file name by using the MAC address; and find a corresponding configuration file according to the acquired configuration file name.

Specifically, a customer goes to a telecommunication business office to apply for service subscription, such as applying for service subscription of a service of 5 M traffic. The service for which the user applies is configured into a CMC device and is saved as a first configuration file, where a format of the first configuration file is a telecommunications format, and the telecommunications format, which is self-defined by each device manufacturer and is a suitable format for a telecommunications network, does not have a unified format standard. When acquiring a message, sent by the CM, for requesting a configuration file, the CMC device extracts the MAC address of the CM from the request message, acquires a configuration file name corresponding to the MAC address according to the correspondence between the MAC address of the CM and the configuration file name, and finds the corresponding configuration file according to the acquired configuration file name. A format of the configuration file is a format of the telecommunications network, and the CMC needs to convert the format of the telecommunications network into a format identifiable by a C-DOCSIS network, such as a disk operating system (Disk Operating System, DOS) format.

This embodiment of the present disclosure provides a CMC, where the CMC receives a DHCP Ack message from a DHCP server and replaces an address of a Trivial File Transfer Protocol TFTP server in the DHCP Ack message with an Internet Protocol IP address of the CMC; the CMC sends the DHCP Ack message carrying the IP address of the CMC to a CM; and the CMC receives, from the CM, a request message for delivering a configuration file, acquires a configuration file corresponding to the CM, and after converting the configuration file corresponding to the CM into a format identifiable by the CM, sends the configuration file to the CM, thereby implementing that a broadcast and television network of a C-DOCSIS standard is compatible and supported on the basis of a telecommunications network configuration system.

Figure 4:
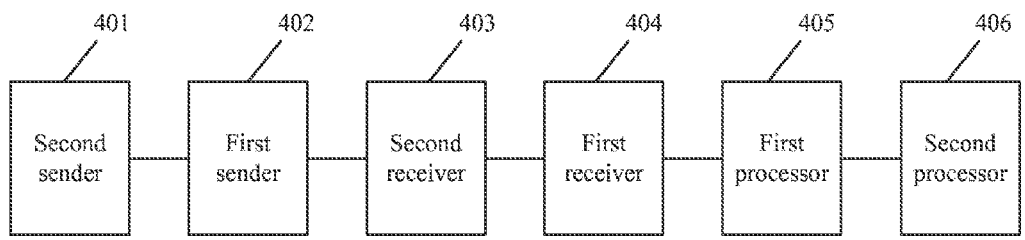
FIG. 4 is an apparatus structural diagram of another CMC according to an embodiment of the present disclosure.

Optionally, refer to FIG. 4. FIG. 4 is an apparatus structural diagram of another CMC according to an embodiment of the present disclosure. As shown in FIG. 4, the CMC includes:

a second sender 401, configured to receive a DHCP Discovery packet from the CM and broadcast the DHCP Discovery packet to a network side;

a first sender 402, further configured to send a DHCP Offer packet from the DHCP server to the CM, where the DHCP Offer packet carries an IP address allocated by the DHCP server to the CM;

a second receiver 403, further configured to receive a DHCP Request message from the CM and send the DHCP Request message to the DHCP server;

a first receiver 404, configured to receive a DHCP Ack message from the DHCP server, where the DHCP Ack message carries an address of a Trivial File Transfer Protocol TFTP server;

a first processor 405, configured to replace the address of the TFTP server in the DHCP Ack message with an IP address of the CMC, where the first sender 402 is configured to send the DHCP Ack message carrying the IP address of the CMC to the CM, and the second receiver 403 is configured to receive, from the CM, a request message for delivering a configuration file; and a second processor 406, configured to acquire a configuration file corresponding to the CM and after converting the configuration file corresponding to the CM into a format identifiable by the CM, send the configuration file to the CM by using the second sender.

Specifically, a customer goes to a telecommunication business office to apply for service subscription, such as applying for service subscription of a service of 5 M traffic. the service for which the user applies is configured into a CMC device and is saved as a first configuration file, where a format of the first configuration file is a telecommunications format, and the telecommunications format, which is self-defined by each device manufacturer and is a suitable format for a telecommunications network, does not have a unified format standard. When acquiring a message, sent by the CM, for requesting a configuration file, the CMC device extracts a MAC address of the CM from the request message, acquires a configuration file name corresponding to the MAC address according to a correspondence between the MAC address of the CM and the configuration file name, and finds a corresponding configuration file according to the acquired configuration file name. A format of the configuration file is a format of the telecommunications network, and the CMC needs to convert the format of the telecommunications network into a format identifiable by a C-DOCSIS network, such as a disk operating system (Disk Operating System, DOS) format.

This embodiment of the present disclosure provides a CMC, where the CMC receives a DHCP Ack message from a DHCP server and replaces an address of a Trivial File Transfer Protocol TFTP server in the DHCP Ack message with an Internet Protocol IP address of the CMC; the CMC sends the DHCP Ack message carrying the IP address of the CMC to a CM; and the CMC receives, from the CM, a request message for delivering a configuration file, acquires a configuration file corresponding to the CM, and after converting the configuration file corresponding to the CM into a format identifiable by the CM, sends the configuration file to the CM, thereby implementing that a broadcast and television network of a C-DOCSIS standard is compatible and supported on the basis of a telecommunications network configuration system.

Figure 5:
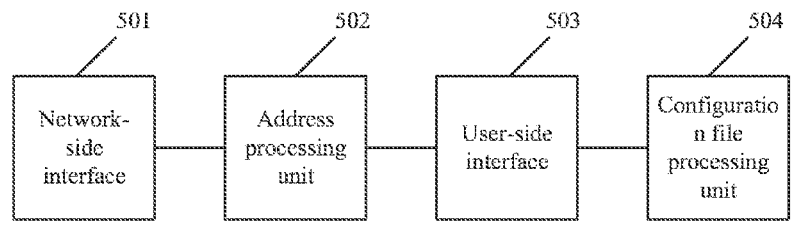
FIG. 5 is an apparatus structural diagram of a CMC according to an embodiment of the present disclosure.

Refer to FIG. 5. FIG. 5 is an apparatus structural diagram of a CMC according to an embodiment of the present disclosure. The CMC connects to a Dynamic Host Configuration Protocol DHCP server on a network side and connects to a cable modem CM on a user side. As shown in FIG. 5, the CMC includes:

a network-side interface 501, configured to receive a DHCP Ack message from the DHCP server, where the DHCP Ack message carries an address of a Trivial File Transfer Protocol TFTP server;

an address processing unit 502, configured to replace the address of the TFTP server in the DHCP Ack message with an IP address of the CMC;

a user-side interface 503, configured to send the DHCP Ack message carrying the IP address of the CMC to the CM and receive, from the CM, a request message for delivering a configuration file; and a configuration file processing unit 504, configured to acquire a configuration file corresponding to the CM and after converting the configuration file corresponding to the CM into a format identifiable by the CM, send the configuration file to the CM by using the user-side interface.

Optionally, the CMC further includes:

a saving unit, configured to save a correspondence between a Media Access Control MAC address of the CM and a configuration file name; and the configuration file processing unit 504 is configured to: extract the MAC address of the CM from the request message, of the CM, for delivering a configuration file, acquire a corresponding configuration file name from the correspondence between the MAC address of the CM and the configuration file name by using the MAC address, and find a corresponding configuration file according to the acquired configuration file name.

Specifically, a customer goes to a telecommunication business office to apply for service subscription, such as applying for service subscription of a service of 5 M traffic. The service for which the user applies is configured into a CMC device and is saved as a first configuration file, where a format of the first configuration file is a telecommunications format, and the telecommunications format, which is self-defined by each device manufacturer and is a suitable format for a telecommunications network, does not have a unified format standard. When acquiring a message, sent by the CM, for requesting a configuration file, the CMC device extracts the MAC address of the CM from the request message, acquires a configuration file name corresponding to the MAC address according to the correspondence between the MAC address of the CM and the configuration file name, and finds the corresponding configuration file according to the acquired configuration file name. A format of the configuration file is a format of the telecommunications network, and the CMC needs to convert the format of the telecommunications network into a format identifiable by a C-DOCSIS network, such as a disk operating system (Disk Operating System, DOS) format.

This embodiment of the present disclosure provides a CMC, where the CMC receives a DHCP Ack message from a DHCP server and replaces an address of a Trivial File Transfer Protocol TFTP server in the DHCP Ack message with an Internet Protocol IP address of the CMC; the CMC sends the DHCP Ack message carrying the IP address of the CMC to a CM; and the CMC receives, from the CM, a request message for delivering a configuration file, acquires a configuration file corresponding to the CM, and after converting the configuration file corresponding to the CM into a format identifiable by the CM, sends the configuration file to the CM, thereby implementing that a broadcast and television network of a C-DOCSIS standard is compatible and supported on the basis of a telecommunications network configuration system.

Figure 6:
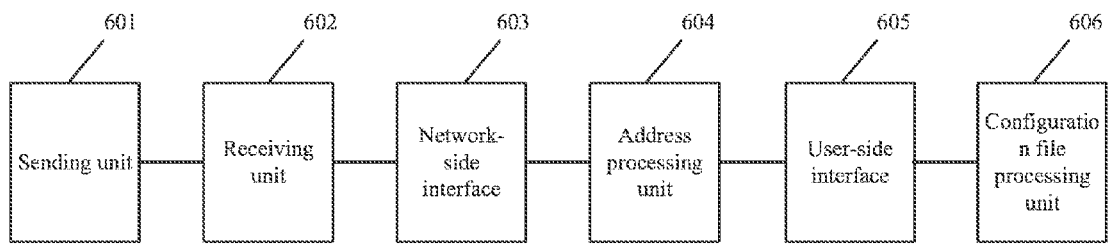
FIG. 6 is an apparatus structural diagram of another CMC according to an embodiment of the present disclosure.

Refer to FIG. 6. FIG. 6 is an apparatus structural diagram of another CMC according to an embodiment of the present disclosure. The CMC connects to a Dynamic Host Configuration Protocol DHCP server on a network side and connects to a cable modem CM on a user side. As shown in FIG. 6, the CMC includes:

a sending unit 601, configured to receive a DHCP Discovery packet from the CM and broadcast the DHCP Discovery packet to the network side, where the sending unit 601 is further configured to send a DHCP Offer packet from the DHCP server to the CM, where the DHCP Offer packet carries an IP address allocated by the DHCP server to the CM;

a receiving unit 602, configured to receive a DHCP Request message from the CM and send the DHCP Request message to the DHCP server;

a network-side interface 603, configured to receive a DHCP Ack message from the DHCP server, where the DHCP Ack message carries an address of a Trivial File Transfer Protocol TFTP server;

an address processing unit 604, configured to replace the address of the TFTP server in the DHCP Ack message with an IP address of the CMC;

a user-side interface 605, further configured to send the DHCP Ack message carrying the IP address of the CMC to the CM and receive, from the CM, a request message for delivering a configuration file; and a configuration file processing unit 606, configured to acquire a configuration file corresponding to the CM and after converting the configuration file corresponding to the CM into a format identifiable by the CM, send the configuration file to the CM by using the user-side interface.

Specifically, a customer goes to a telecommunication business office to apply for service subscription, such as applying for service subscription of a service of 5 M traffic. The service for which the user applies is configured into a CMC device and is saved as a first configuration file, where a format of the first configuration file is a telecommunications format, and the telecommunications format, which is self-defined by each device manufacturer and is a suitable format for a telecommunications network, does not have a unified format standard. When acquiring a message, sent by the CM, for requesting a configuration file, the CMC device extracts a MAC address of the CM from the request message, acquires a configuration file name corresponding to the MAC address according to a correspondence between the MAC address of the CM and the configuration file name, and finds a corresponding configuration file according to the acquired configuration file name. A format of the configuration file is a format of the telecommunications network, and the CMC needs to convert the format of the telecommunications network into a format identifiable by a C-DOCSIS network, such as a disk operating system (Disk Operating System, DOS) format.

This embodiment of the present disclosure provides a CMC, where the CMC receives a DHCP Ack message from a DHCP server and replaces an address of a Trivial File Transfer Protocol TFTP server in the DHCP Ack message with an Internet Protocol IP address of the CMC; the CMC sends the DHCP Ack message carrying the IP address of the CMC to a CM; and the CMC receives, from the CM, a request message for delivering a configuration file, acquires a configuration file corresponding to the CM, and after converting the configuration file corresponding to the CM into a format identifiable by the CM, sends the configuration file to the CM, thereby implementing that a broadcast and television network of a C-DOCSIS standard is compatible and supported on the basis of a telecommunications network configuration system.

Figure 7:
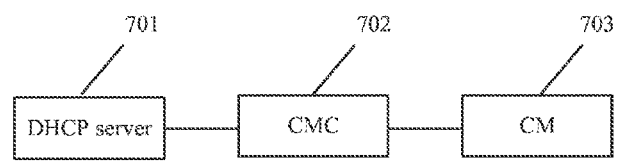
FIG. 7 is a structural diagram of a coaxial cable system according to an embodiment of the present disclosure.

Refer to FIG. 7. FIG. 7 is a structural diagram of a coaxial cable system according to an embodiment of the present disclosure. As shown in FIG. 7, the Cable system includes a Dynamic Host Configuration Protocol DHCP server 701, a coaxial media converter CMC 702, and a cable modem CM 703, where the CMC 702 connects to the DHCP server 701 on a network side and connects to the CM 703 on a user side, where:

the CMC 702 is configured to receive a DHCP Ack message from the DHCP server and replace an address of a Trivial File Transfer Protocol server in the DHCP Ack message with an IP address of the CMC; send the DHCP Ack message carrying the IP address of the CMC to the CM; and receive, from the CM, a request message for delivering a configuration file, acquire a configuration file corresponding to the CM, and after converting the configuration file corresponding to the CM into a format identifiable by the CM, send the configuration file to the CM.

The CMC 702 is further configured to:

receive a DHCP Discovery packet from the CM and broadcast the DHCP Discovery packet to the network side;

send a DHCP Offer packet from the DHCP server to the CM, where the DHCP Offer packet carries an IP address allocated by the DHCP server to the CM; and receive a DHCP Request message from the CM and send the DHCP Request message to the DHCP server.

The CMC 702 is further configured to:

save a correspondence between a Media Access Control MAC address of the CM and a configuration file name; and the acquiring a configuration file corresponding to the CM specifically includes:

extracting the MAC address of the CM from the request message, of the CM, for delivering a configuration file, acquiring a corresponding configuration file name from the correspondence between the MAC address of the CM and the configuration file name by using the MAC address, and finding a corresponding configuration file according to the acquired configuration file name.

Specifically, a customer goes to a telecommunication business office to apply for service subscription, such as applying for service subscription of a service of 5 M traffic. The service for which the user applies is configured into a CMC device and is saved as a first configuration file, where a format of the first configuration file is a telecommunications format, and the telecommunications format, which is self-defined by each device manufacturer and is a suitable format for a telecommunications network, does not have a unified format standard. When acquiring a message, sent by the CM, for requesting a configuration file, the CMC device extracts the MAC address of the CM from the request message, acquires a configuration file name corresponding to the MAC address according to the correspondence between the MAC address of the CM and the configuration file name, and finds the corresponding configuration file according to the acquired configuration file name. A format of the configuration file is a format of the telecommunications network, and the CMC needs to convert the format of the telecommunications network into a format identifiable by a C-DOCSIS network, such as a disk operating system (Disk Operating System, DOS) format.

This embodiment of the present disclosure provides a coaxial cable system, where in the system, a CMC receives a DHCP Ack message from a DHCP server and replaces an address of a Trivial File Transfer Protocol TFTP server in the DHCP Ack message with an Internet Protocol IP address of the CMC; the CMC sends the DHCP Ack message carrying the IP address of the CMC to a CM; and the CMC receives, from the CM, a request message for delivering a configuration file, acquires a configuration file corresponding to the CM, and after converting the configuration file corresponding to the CM into a format identifiable by the CM, sends the configuration file to the CM, thereby implementing that a broadcast and television network of a C-DOCSIS standard is compatible and supported on the basis of a telecommunications network configuration system.

Figure 8:
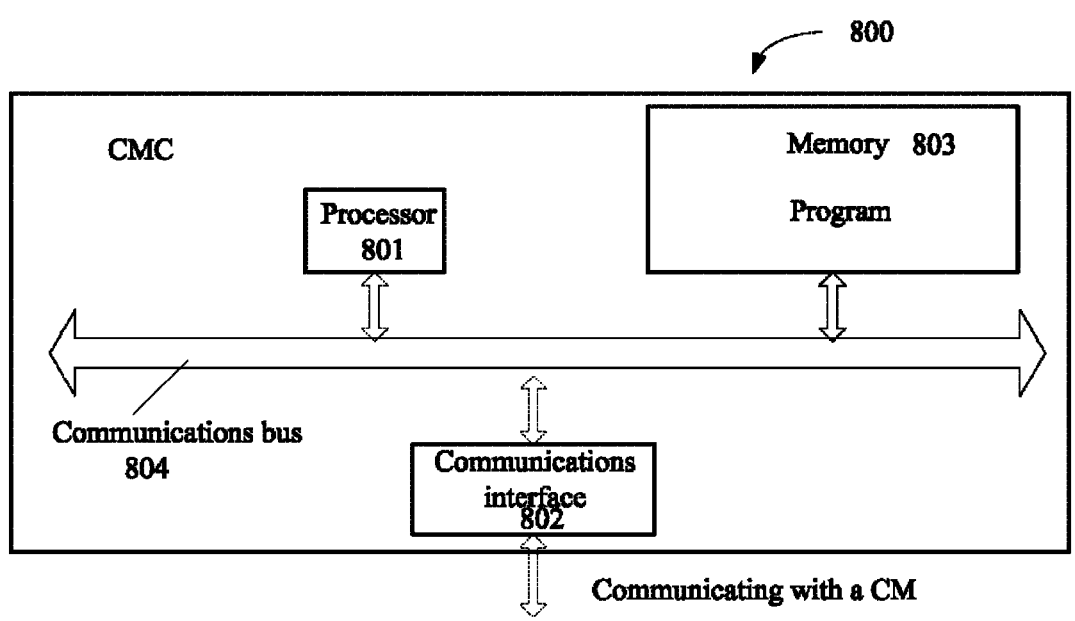
FIG. 8 is an apparatus structural diagram of a CMC according to an embodiment of the present disclosure.

Refer to FIG. 8. FIG. 8 is an apparatus structural diagram of a CMC according to an embodiment of the present disclosure. Refer to FIG. 8. FIG. 8 illustrates a CMC 800 according to an embodiment of the present disclosure, and this specific embodiment of the present disclosure makes no limitation on specific implementation of the CMC. The CMC 800 includes:

a processor (processor) 801, a communications interface (Communications Interface) 802, a memory (memory) 803, and a bus 804.

The processor 801, the communications interface 802, and the memory 803 complete communication with each other by using the bus 804.

The communications interface 802 is configured to communicate with a CM; and the processor 801 is configured to execute a program.

Specifically, the program may include program code, where the program code includes a computer operation instruction.

The processor 801 may be a central processing unit (central processing unit, CPU), an application-specific integrated circuit ASIC (Application Specific Integrated Circuit), or one or more integrated circuits configured to implement this embodiment of the present disclosure.

The memory 803 is configured to save a program. The memory 803 may be a volatile memory (volatile memory) such as a random-access memory (random-access memory, RAM) or a non-volatile memory (non-volatile memory), such as a read-only memory (read-only memory, ROM), a flash memory (flash memory), a hard disk drive (hard disk drive, HDD), or a solid-state drive (solid-state drive, SSD). The processor 801 executes the following method according to a program instruction saved in the memory 803:

The CMC receives a DHCP Ack message from the DHCP server and replaces an address of a Trivial File Transfer Protocol TFTP server in the DHCP Ack message with an Internet Protocol IP address of the CMC;

the CMC sends the DHCP Ack message carrying the IP address of the CMC to the CM; and the CMC receives, from the CM, a request message for delivering a configuration file, acquires a configuration file corresponding to the CM, and after converting the configuration file corresponding to the CM into a format identifiable by the CM, sends the configuration file to the CM.

Before the receiving, by the CMC, a DHCP Ack message from the DHCP server, the method further includes:

receiving, by the CMC, a DHCP Discovery packet from the CM and broadcasting the DHCP Discovery packet to a network side;

sending, by the CMC, a DHCP Offer packet from the DHCP server to the CM, where the DHCP Offer message carries an IP address allocated by the DHCP server to the CM; and receiving, by the CMC, a DHCP Request message from the CM and sending the DHCP Request message to the DHCP server.

Before the acquiring a configuration file corresponding to the CM, the method further includes:

saving, by the CMC, a correspondence between a Media Access Control MAC address of the CM and a configuration file name; and the acquiring a configuration file corresponding to the CM specifically includes:

extracting the MAC address of the CM from the request message, of the CM, for delivering a configuration file, acquiring a corresponding configuration file name from the correspondence between the MAC address of the CM and the configuration file name by using the MAC address, and finding a corresponding configuration file according to the acquired configuration file name.

The format identifiable by the CM complies with the Data Over Cable Service Interface Specification.

The foregoing descriptions are merely exemplary specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A service provisioning method in a coaxial cable system, wherein the Cable system comprises a Dynamic Host Configuration Protocol (DHCP) server, a coaxial media converter (CMC), and a cable modem (CM); the CMC connects to the DHCP server on a network side and connects to the CM on a user side; and the method comprises:
receiving, by the CMC, a DHCP Ack message from the DHCP server and replacing an address of a Trivial File Transfer Protocol (TFTP) server in the DHCP Ack message with an Internet Protocol (IP) address of the CMC;
sending, by the CMC, the DHCP Ack message carrying the IP address of the CMC to the CM; and
receiving, by the CMC from the CM, a request message for delivering a configuration file, acquiring the configuration file corresponding to the CM, and after converting the configuration file corresponding to the CM into a format identifiable by the CM, sending the configuration file to the CM.

2. The method according to claim 1, before the receiving, by the CMC, a DHCP Ack message from the DHCP server, further comprising:
receiving, by the CMC, a DHCP Discovery packet from the CM and broadcasting the DHCP Discovery packet to the network side;
sending, by the CMC, a DHCP Offer packet from the DHCP server to the CM, wherein the DHCP Offer packet carries an IP address allocated by the DHCP server to the CM; and
receiving, by the CMC, a DHCP Request message from the CM and sending the DHCP Request message to the DHCP server.

3. The method according to claim 1, before the acquiring the configuration file corresponding to the CM, further comprising:
storing, by the CMC, a correspondence between a Media Access Control (MAC) address of the CM and a configuration file name, wherein:
the acquiring the configuration file corresponding to the CM specifically comprises:
extracting the MAC address of the CM from the request message, of the CM, for delivering the configuration file, acquiring a corresponding configuration file name from the correspondence between the MAC address of the CM and the configuration file name by using the MAC address, and finding a corresponding configuration file according to the configuration file name acquired.

4. The method according to claim 1, wherein the format identifiable by the CM complies with the Data Over Cable Service Interface Specification.

5. A coaxial media converter (CMC), wherein the CMC connects to a Dynamic Host Configuration Protocol (DHCP) server on a network side and connects to a cable modem (CM) on a user side, and the CMC comprises:
a first receiver, configured to receive a DHCP Ack message from the DHCP server, wherein the DHCP Ack message carries an address of a Trivial File Transfer Protocol (TFTP) server;
a first processor, configured to replace the address of the TFTP server in the DHCP Ack message with an IP address of the CMC;
a first sender, configured to send the DHCP Ack message carrying the IP address of the CMC to the CM;
a second receiver, configured to receive, from the CM, a request message for delivering a configuration file; and
a second processor, configured to acquire the configuration file corresponding to the CM and after converting the configuration file corresponding to the CM into a format identifiable by the CM, send the configuration file to the CM by using a second sender.

6. The CMC according to claim 5, wherein the CMC further comprises:
the second sender, configured to receive a DHCP Discovery packet from the CM and broadcast the DHCP Discovery packet to the network side, wherein:
the first sender is further configured to send a DHCP Offer packet from the DHCP server to the CM, wherein the DHCP Offer packet carries an IP address allocated by the DHCP server to the CM; and
the second receiver is further configured to receive a DHCP Request message from the CM and send the DHCP Request message to the DHCP server.

7. The CMC according to claim 5, wherein the CMC further comprises:
a memory, configured to save a correspondence between a Media Access Control MAC address of the CM and a configuration file name; and
the second processor is specifically configured to:
extract the MAC address of the CM from the request message, of the CM, for delivering the configuration file, acquire a corresponding configuration file name from the correspondence between the MAC address of the CM and the configuration file name by using the MAC address, and find a corresponding configuration file according to the configuration file name acquired.

8. A coaxial media converter (CMC), wherein the CMC connects to a Dynamic Host Configuration Protocol (DHCP) server on a network side and connects to a cable modem (CM) on a user side, and the CMC comprises:
a processor; and
a computer readable storage medium storing programming for execution by the processor, the programming including instructions to:
receive a DHCP Ack message from the DHCP server, wherein the DHCP Ack message carries an address of a Trivial File Transfer Protocol (TFTP) server;
replace the address of the TFTP server in the DHCP Ack message with an IP address of the CMC;
send the DHCP Ack message carrying the IP address of the CMC to the CM and receive, from the CM, a request message for delivering a configuration file; and
acquire the configuration file corresponding to the CM and after converting the configuration file corresponding to the CM into a format identifiable by the CM, send the configuration file to the CM by using the user-side interface.

9. The CMC according to claim 8, the programming further including instructions to:
receive a DHCP Discovery packet from the CM and broadcast the DHCP Discovery packet to the network side, wherein:
the programming further includes instructions to send a DHCP Offer packet from the DHCP server to the CM, wherein the DHCP Offer packet carries an IP address allocated by the DHCP server to the CM; and receive a DHCP Request message from the CM and send the DHCP Request message to the DHCP server.

10. The CMC according to claim 8, the programming further including instructions to:

save a correspondence between a Media Access Control (MAC) address of the CM and a configuration file name; and extract the MAC address of the CM from the request message, of the CM, for delivering the configuration file, acquire a corresponding configuration file name from the correspondence between the MAC address of the CM and the configuration file name by using the MAC address, and find a corresponding configuration file according to the configuration file name acquired.

11. A coaxial cable system, wherein the Cable system comprises a Dynamic Host Configuration Protocol (DHCP) server, a coaxial media converter (CMC), and a cable modem (CM); and the CMC connects to the DHCP server on a network side and connects to the CM on a user side, wherein:

the CMC is configured to receive a DHCP Ack message from the DHCP server and replace an address of a Trivial File Transfer Protocol server with an IP address of the CMC; send the DHCP Ack message carrying the IP address of the CMC to the CM; and receive, from the CM, a request message for delivering a configuration file, acquire the configuration file corresponding to the CM, and after converting the configuration file corresponding to the CM into a format identifiable by the CM, send the configuration file to the CM.

12. The system according to claim 11, wherein the CMC is further configured to:

receive a DHCP Discovery packet from the CM and broadcast the DHCP Discovery packet to the network side;

send a DHCP Offer packet from the DHCP server to the CM, wherein the DHCP Offer packet carries an IP address allocated by the DHCP server to the CM; and receive a DHCP Request message from the CM and send the DHCP Request message to the DHCP server.

13. The system according to claim 11, wherein the CMC is further configured to:

save a correspondence between a Media Access Control (MAC) address of the CM and a configuration file name; and the acquiring the configuration file corresponding to the CM specifically comprises:

extracting the MAC address of the CM from the request message, of the CM, for delivering the configuration file, acquiring a corresponding configuration file name from the correspondence between the MAC address of the CM and the configuration file name by using the MAC address, and finding a corresponding configuration file according to the configuration file name acquired.

* * * * *